(12) United States Patent
Baron et al.

(10) Patent No.: US 9,591,554 B2
(45) Date of Patent: Mar. 7, 2017

(54) MANAGEMENT CAPABILITIES FOR A WIRELESS DOCKING EXPERIENCE

(71) Applicant: Microsoft Technology Licensing, LLC, Redmond, WA (US)

(72) Inventors: Andrew Thomas Baron, Redmond, WA (US); Chih-Chung Chang, Redmond, WA (US); Eliot John Flannery, Seattle, WA (US); Gianluigi Nusca, Seattle, WA (US); Vineet Venugopal, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/482,649

(22) Filed: Sep. 10, 2014

(65) Prior Publication Data

US 2016/0073435 A1    Mar. 10, 2016

(51) Int. Cl.
*H04W 76/00* (2009.01)
*H04W 48/10* (2009.01)
*H04W 4/00* (2009.01)
*H04W 4/06* (2009.01)

(52) U.S. Cl.
CPC ........... *H04W 48/10* (2013.01); *H04W 4/001* (2013.01); *H04W 4/008* (2013.01); *H04W 4/06* (2013.01)

(58) Field of Classification Search
CPC ............. G06F 19/3418; G06F 19/3468; G06F 1/1632; G06F 13/00; G06Q 50/22
See application file for complete search history.

(56) References Cited

U.S. PATENT DOCUMENTS 8,055,197 B2    11/2011    Lyu et al.
8,098,806 B2    1/2012    Shostak
8,254,992 B1 *  8/2012    Ashenbrenner ....... G06F 1/1632
                                                          455/41.2
8,554,970 B2    10/2013    Suumäki et al.
(Continued)

FOREIGN PATENT DOCUMENTS

WO    WO-2014057465    4/2014

OTHER PUBLICATIONS

"Airdock", Retrieved From: <http://56denmark.com/index.php/support> Aug. 21, 2014, 2014, 6 Pages.
(Continued)

*Primary Examiner* — Bobbak Safaipour
(74) *Attorney, Agent, or Firm* — Sunah Lee; Dan Choi; Micky Minhas

(57) ABSTRACT

This document describes management capabilities for a wireless docking experience. A wireless dock is configured to connect to multiple peripheral devices, such as a monitor, a keyboard, and a mouse. Mobile devices can connect to the wireless dock, via a short-range wireless connection, to utilize the multiple peripheral devices. When deployed with other wireless docks, the wireless dock can be configured to provide management information with a broadcast signal that is usable by the mobile devices to manage the wireless connection to, and experience with, the wireless dock. The management information can include one or more of a do-not-automatically-connect indicator, an in-use indicator, an Internet-available indicator, or a group identifier.

19 Claims, 12 Drawing Sheets

(56) References Cited

U.S. PATENT DOCUMENTS

| | | | |
|---|---|---|---|
| 2012/0265913 A1 | 10/2012 | Suumaeki et al. | |
| 2012/0297229 A1 | 11/2012 | Desai et al. | |
| 2014/0146745 A1 | 5/2014 | Huang et al. | |
| 2014/0259136 A1* | 9/2014 | Levy | H04L 63/0876 726/7 |
| 2014/0351479 A1* | 11/2014 | Lee | H04W 12/08 710/303 |
| 2015/0205747 A1* | 7/2015 | Dees | H04M 1/7253 710/303 |

OTHER PUBLICATIONS

"Cable Modem Overview", Retrieved From: <http://help.suddenlink.com/internet/Pages/CableModemOverview.aspx?product=Modem> Aug. 21, 2014, 2013, 2 Page.

"Cisco Model DPQ3212 8×4 DOCSIS 3.0 Cable Modem with Embedded Digital Voice Adapter User Guide", Available at: <http://www.cisco.com/c/dam/en/us/td/docs/video/at_home/Cable_Modems/3200_Series/OL-30823-01.pdf>, Oct. 2013, 42 Pages.

"Dell Wireless Dock—WiGig", Retrieved From: <http://www.advania.is/library/Files/1.-Vefverslun-> Aug. 21, 2014, Aug. 23, 2013, 3 Pages.

"Dell Wireless Dock D5000", Available at: <ftp://ftp.dell.com/Manuals/all-products/esuprt_electronics/esuprt_docking_stations/dell-wir-dck_User's%20Guide2_en-us.pdf>, Feb. 2013, 52 Pages.

"Sierra Wireless AirCard® Hub", Available at: <https://www.dna.fi/documents/15182/18521/DNA_4g_WLAN_kotiasema_quickuserguide.pdf/8c16021d-7483-4a58-96b2-eb2deef629dd>, 2011, 12 Pages.

"Soundlink® Wireless Mobile Speaker", Available at: <http://www.bose.com/assets/pdf/soundlink/owg_en_soundlink2.pdf>, 2011, 25 Pages.

"International Search Report and Written Opinion", Application No. PCT/US2015/049267, Dec. 11, 2015, 11 pages.

"International Preliminary Report on Patentability", Application No. PCT/US2015/049267, Aug. 24, 2016, 7 pages.

\* cited by examiner

MANAGEMENT CAPABILITIES FOR A WIRELESS DOCKING EXPERIENCE

BACKGROUND

There are various common wireless technologies deployed today in homes, offices, and in public. Many of these wireless technologies are considered shared mediums that are used simultaneously by numerous user devices. For example a mobile broadband cellular tower may have numerous mobile phones connected simultaneously utilizing that network. The same is true for Wi-Fi networks, both in the home or in the office, in that multiple users can access this shared medium simultaneously.

But there is a new emerging wireless solution that is somewhat different: wireless docking. With the introduction of this solution a user will establish a wireless connection with a wireless dock, but only one user may be able to utilize the wireless dock at any one time. Thus, the simultaneity that exists for other common wireless connections may not be applicable to wireless docks. In addition, wireless docks are expected to be deployed and used in Enterprise environments. For example, Enterprises may deploy groups of wireless docks in shared office workspaces so that employees can come to a location, dock their mobile device with any available wireless dock, and perform work. This means that each of these wireless docks may be used throughout the day by numerous individual users, but only one at a time. This new type of usage requires new and different behaviors both from the mobile devices connecting to the wireless dock and the wireless dock itself.

SUMMARY

This document describes management capabilities for a wireless docking experience. A wireless dock is configured to connect to multiple peripheral devices, such as a monitor, a keyboard, and a mouse. Mobile devices can connect to the wireless dock, via a short-range wireless connection, to utilize the multiple peripheral devices. When deployed with other wireless docks, the wireless dock can be configured to provide management information with a broadcast signal that is usable by the mobile devices to manage the wireless connection to, and experience with, the wireless dock. The management information can include one or more of a do-not-automatically-connect indicator, an in-use indicator, an Internet-available indicator, or a group identifier.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
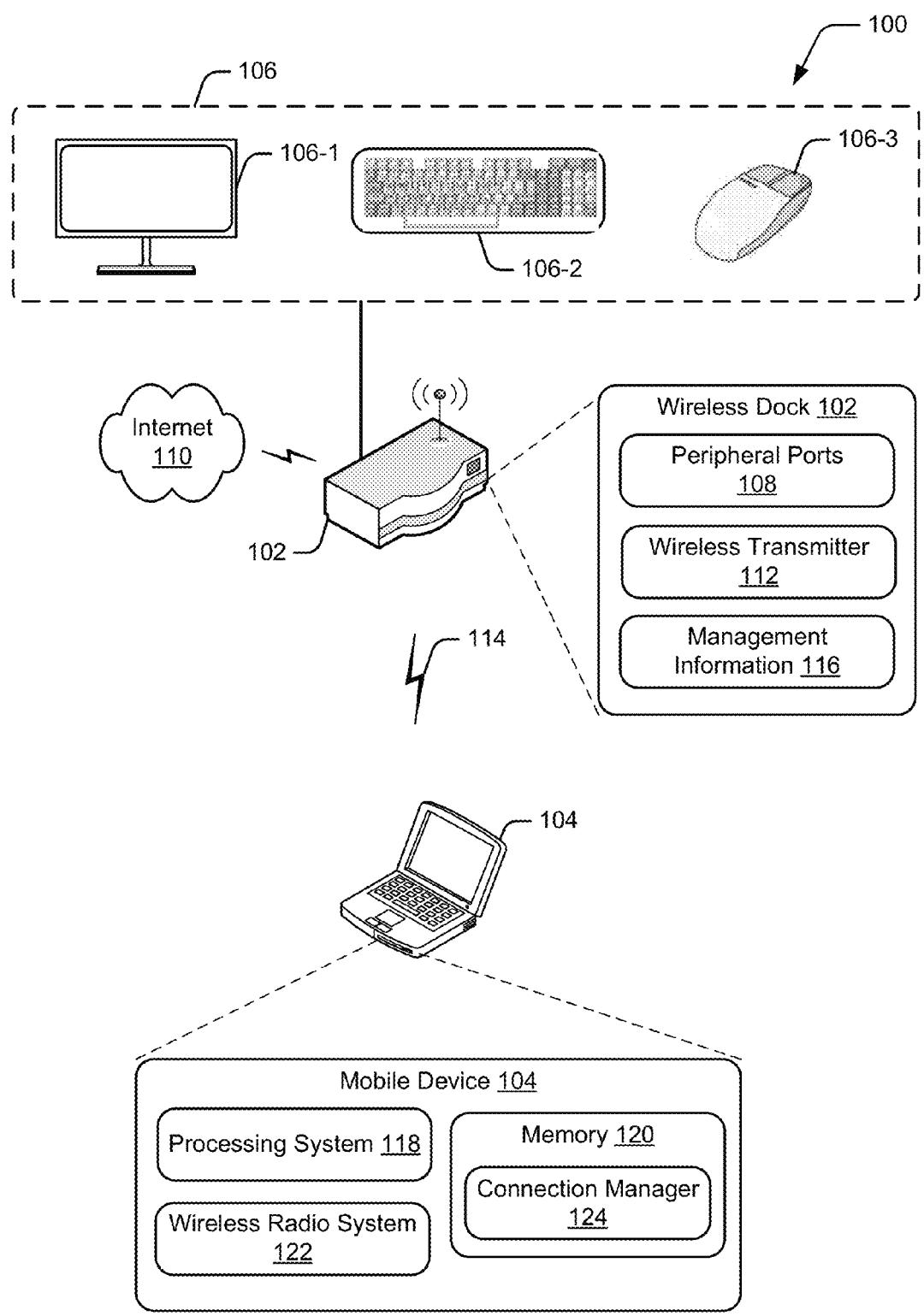
FIG. 1 is an illustration of an environment in an example implementation that is operable to perform management capabilities for a wireless docking experience.

This document describes management capabilities for a wireless docking experience. A wireless dock is configured to connect to multiple peripheral devices, such as a monitor, a keyboard, and a mouse. Mobile devices can connect to the wireless dock, via a short-range wireless connection, to utilize the multiple peripheral devices. When deployed with other wireless docks, the wireless dock can be configured to provide management information with a broadcast signal that is usable by the mobile devices to manage the wireless connection to, and experience with, the wireless dock.

Conventional wireless connection software allows for automatic connections to a wireless device or infrastructure without the user needing to manually establish the connection each time the user wishes to connect. In the case of a wireless dock that has been deployed in a shared office workspace, it is important to ensure that a user does not automatically connect to a wireless dock because multiple wireless docks may be deployed in close proximity to each other. Thus, in one or more implementations, the management information provided by the wireless docks includes a "do-not automatically connect indicator" that causes the connection manager to prevent mobile devices from automatically connecting to detected wireless docks.

Given that user may walk up to a shared office workspace that provides several identical wireless docks, grouped closely together, and select a wireless dock that is available it may be helpful to present to the user some indication that a given wireless dock is in use and not currently available. Thus, in one or more implementations the management information provided by the wireless dock includes an in-use indicator when the wireless dock is currently being used. The in-use indicator causes the connection manager to prevent the mobile device from connecting to a wireless dock that is already being used by a different mobile device.

Generally speaking wireless docks offer connectivity to peripherals devices, but may not typically offer connectivity to the Internet. However, in some cases a wireless dock may offer a connection to the Internet. Knowing this information in advance of connecting enables a mobile device to display this information to the user or allow the connection manager or the user to select a wireless dock that offers Internet access over those that do not. Thus, in one or more implementations the management information provided by the wireless dock includes an Internet-available indicator which enables the connection manager to determine wireless docks that are configured with Internet connectivity.

When a group of wireless docks are deployed in a shared office workspace they may each provide identical hardware capabilities, such as the same display type, the same number of displays, the same mouse, the same keyboard, and so on. Thus, in one or more implementations, the management information provided by the wireless dock includes a group identifier that is associated with a number of individual wireless docks. The group identifier causes the connection manager to treat all wireless docks with the same group identifier similarly, and thus provides a consistent wireless docking experience.

Example Environment

FIG. 1 is an illustration of an environment 100 in an example implementation that is operable to employ management capabilities for a wireless docking experience. The illustrated environment 100 includes a wireless dock 102 and a mobile device 104 which can wirelessly connect to wireless dock 102 to utilize various peripheral devices 106 attached to wireless dock 102.

Wireless dock 102 includes peripheral ports 108 which enable peripheral devices 106 to connect to wireless dock 102. In this example, peripheral devices 106 includes a monitor 106-1, a keyboard 106-2, and a mouse 106-3. However, a variety of other peripheral devices may also connect to wireless dock 102 via peripheral ports 108, such as printers, speakers, storage media, and so forth. Peripheral ports 108 may also enable wireless dock 102 to be connected to the Internet 110, such as via a Wi-Fi radio or an Ethernet connection.

Wireless dock 102 includes a wireless transmitter 112 that is configured to transmit broadcast signals which can be detected by mobile device 104, and used by mobile device 104 to establish a short-range wireless connection 114 to wireless dock 102. In various implementations, the short-range wireless connection is a WiGig wireless connection. However, wireless dock 102 may also be able to use any other type of short-range wireless technology, such as wireless USB or Bluetooth™, to name just a few.

WiGig is a wireless technology that is implemented based on the Wireless Gigabit Alliance, IEEE 802.11ad protocol for multi-gigabit speed wireless data communication over the unlicensed 60 GHz frequency band. The WiGig protocol provides high-performance wireless data communication of audio, video, and image data, and can be utilized to supplement the capabilities of wireless LAN communications at much faster speeds, while also maintaining compatibility with existing Wi-Fi devices. The WiGig 60 GHz frequency is a short-range wireless communication solution, generally implemented to communicatively-linked home entertainment and office computing devices within a short range of each other. Comparatively, other wireless communications technologies, such as WiFi, have a larger communication range than the WiGig wireless communication technology.

In accordance with various implementations, wireless dock 102 can be configured to provide management information 116 with broadcast signals transmitted using wireless transmitter 112. Management information 116 can be detected by mobile device 104 during the scanning and discovery phase, or any time prior to wireless connection 114 being established.

Management information 116 enables mobile device 104 to make an informed decision to connect to wireless dock 102 when wireless dock 102 is employed in close proximity to other wireless docks, such as in an Enterprise setting. In some cases, management information 116 causes mobile device 104 to perform specific connection activities, such as preventing mobile device 104 from automatically connecting to wireless dock 102 and/or presenting management information 116 in a user interface to enable the user to select a wireless dock. Wireless dock 102 may provide a variety of different types of information with management information 116 including a "do not automatically connect" indicator, an "in-use" indictor, an "Internet-available" indicator, and/or a group identifier, each of which are discussed in more detail below.

Mobile devices 104 can wirelessly connect to wireless dock 102 to utilize the various peripheral devices 106 connected to wireless dock 102. In FIG. 1, for example, mobile device 104 can wirelessly connect to wireless dock 102 to utilize monitor 106-1, keyboard 106-2, and mouse 106-3. In this example, mobile device 104 is illustrated as a laptop computer. However, mobile devices 104 can include any type of mobile device, such as tablet computers, smartphones, or any other computing, gaming, media playback, entertainment, and/or electronic media device that is configured for wireless communication.

Mobile device 104 can be implemented with various components, such as a processing system 118, a memory 120, and with any number and combination of different components as further described with reference to the example device shown in FIG. 9.

Mobile device 104 also includes a short-range wireless radio system ("wireless radio system") 122 to enable mobile device 104 to wirelessly connect to wireless dock 102. In various implementations, wireless radio system 122 is implemented as a WiGig radio system that enables mobile device 104 to wirelessly connect to a WiGig-enabled wireless dock 102. However, wireless radio system 122 may be implemented as any type of short-range wireless radio system, such as wireless USB radio system, a Bluetooth™ radio system, and so forth.

Wireless radio system 122 can include a radio device, antenna, and chipset that is implemented for a particular wireless communications technology. Generally, when activated or turned-on, wireless radio system 122 automatically scans for a station or an endpoint connection, such as wireless dock 102. For example, when implemented as a WiGig radio system, wireless radio system 122 is implemented to scan for a WiGig endpoint, such as a WiGig-enabled wireless dock 102 that is within communication range or close proximity to mobile device 104.

Mobile device 104 also includes a connection manager 124 that can be implemented as a software application or module, such as executable software instructions (e.g., computer-executable instructions) that are executable with processing system 118 of the mobile device to implement embodiments of management capabilities for a wireless docking experience. Connection manager 124 can be stored on computer-readable storage memory (e.g., memory 120), such as any suitable memory device or electronic data storage implemented by the mobile device. In implementations, connection manager 124 is a component of the device operating system, or can be implemented as part of a wireless connection service on the mobile device.

Conventionally, wireless radio systems are controlled to automatically establish a wireless connection to a wireless endpoint when the wireless endpoint is detected. However, when multiple wireless docks 102 are deployed in an Enterprise setting, it may be beneficial to provide different connection behaviors.

Thus, in accordance with various implementations, connection manager 124 is configured to perform specific connection activities to establish a wireless connection to wireless dock 102 when wireless dock 102 is deployed in close proximity to other wireless docks, such as in an Enterprise setting. For example, connection manager 124 can prevent mobile device 104 from automatically connecting to wireless dock 102 and/or present management information 116, associated with multiple detected wireless docks 102, in a user interface to enable user selection of a specific wireless dock 102.

Consider now a discussion of the various types of information that may be provided by wireless dock 102 with management information 116, as well as the specific connection activities that may be performed by connection manager 124 to implement management capabilities for a wireless docking experience.

Do-Not-Automatically-Connect Indicator

Conventional wireless connection software allows for automatic connections to a wireless device or infrastructure without the user needing to manually establish the connection each time the user wishes to connect. In the case of a wireless dock that has been deployed in a shared office workspace, however, users or IT managers of the wireless dock may rather not automatically connect to a wireless dock because multiple wireless docks may be deployed in close proximity to each other. Thus, in one or more implementations, management information 116 provided by wireless docks 102 includes a "do-not automatically connect indicator" that causes connection manager 124 to prevent mobile device 104 from automatically connecting to detected wireless docks.

Figure 2A:
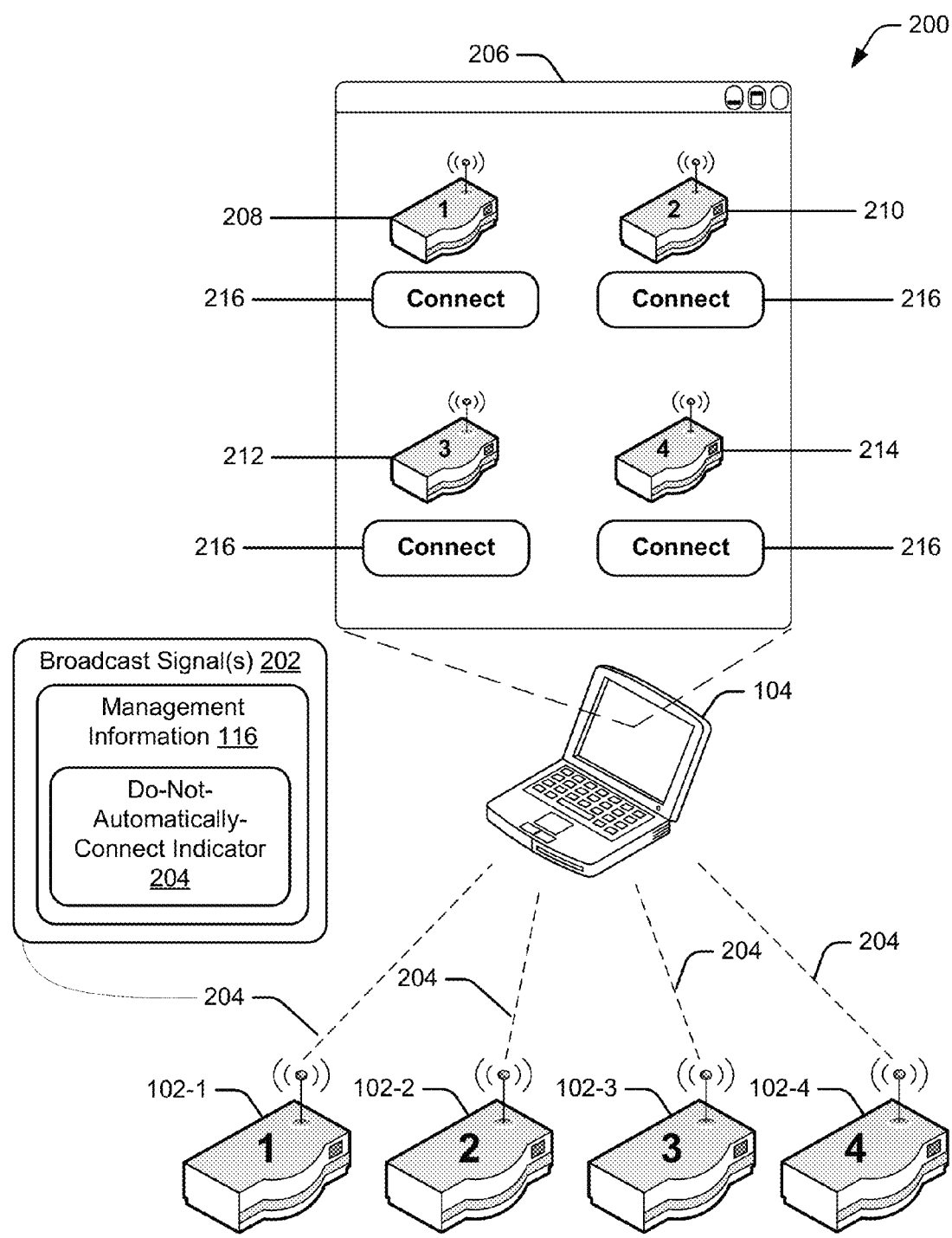
FIG. 2a illustrates an example of a wireless dock providing a do-not-automatically-connect indicator with management information.

Consider, for example, FIG. 2a which illustrates an example 200 of a wireless dock providing a do-not-automatically-connect indicator with management information. In this example, a first wireless dock 102-1, a second wireless dock 102-2, a third wireless dock 102-3, and a fourth wireless dock 102-4 are deployed in close proximity to each other. For example, the wireless docks may be deployed in an office or Enterprise setting to enable employees to wirelessly connect mobile devices to one of the wireless docks to utilize peripheral devices 106 (not pictured in FIG. 2) which are attached to each wireless dock, such as a monitor 106-1, keyboard 106-2, and mouse 106-3.

Wireless transmitter 112, at each of wireless docks 102-1, 102-2, 102-3, and 102-4, transmits broadcast signals 202 that can be detected by mobile devices equipped with a wireless radio when the mobile devices are within range to connect to the wireless docks.

To prevent mobile devices from automatically connecting to wireless dock 102, wireless dock 102 can be configured to provide a do-not-automatically-connect indicator 204 with management information 116. In FIG. 2a, for example, each wireless dock 102-1, 102-2, 102-3, and 102-4 provides a do-not-automatically-connect indicator 204 with management information 116, which is communicated with broadcast signals 202.

When mobile device 104 moves within communication range to wireless docks 102-1, 102-2, 102-3, and 102-4, wireless radio system 122 scans for and detects wireless docks 102-1, 102-2, 102-3, and 102-4. For example, wireless radio system 122 detects broadcast signals 202 transmitted by wireless transmitter 112 from each wireless dock 102. Conventional wireless connection software is configured to automatically connect to one of wireless docks 102-1, 102-2, 102-3, or 102-4 responsive to detecting broadcast signals 202 (e.g., the first wireless dock that is detected by wireless radio system 122).

Now, connection manager 124 detects do-not-automatically-connect indicator 204 in broadcast signals 202 of each of wireless docks 102-1, 102-2, 102-3, and 102-4, which causes connection manager 124 to prevent mobile device 104 from automatically connecting to any of the detected wireless docks.

Rather than automatically connecting to one of the detected wireless docks, connection manager 124 enables a user of the mobile device to manually select one of the wireless docks. For example, to enable the manual selection of one of wireless docks 102-1, 102-2, 102-3, or 102-4, connection manager 124 causes display of a connection user interface 206 on a display of mobile device 104. Connection user interface 206 enables selection of one of the detected wireless docks 102. In this example, connection user interface 206 includes wireless dock identifiers 208, 210, 212, and 214, which correspond to detected wireless docks 102-1, 102-2, 102-3, and 102-4, respectively.

In addition, each wireless dock identifier in connection user interface 206 includes a respective connection control 216, which can be selected to connect to the respective wireless dock 102. For example, connection control 216 associated with wireless dock identifier 208 can be selected to establish a wireless connection with wireless dock 102-1.

Responsive to receiving selection of one of wireless dock identifiers 208, 210, 212, or 214, connection manager 124 wirelessly connects to the associated wireless dock to enable mobile device 104 to use peripheral devices 106 attached to the wireless dock.

In-Use Indicator

Given that user may walk up to a shared office workspace that provides several identical wireless docks, grouped closely together, and select a wireless dock that is available it may be helpful to present to the user some indication that a given wireless dock is in use and not currently available. Thus, in one or more implementations wireless dock 102 can provide an in-use indicator with management information 116 when the wireless dock is currently being used. The in-use indicator causes connection manager 124 to prevent mobile device 104 from connecting to a wireless dock that is currently being used by a different mobile device.

Figure 2B:
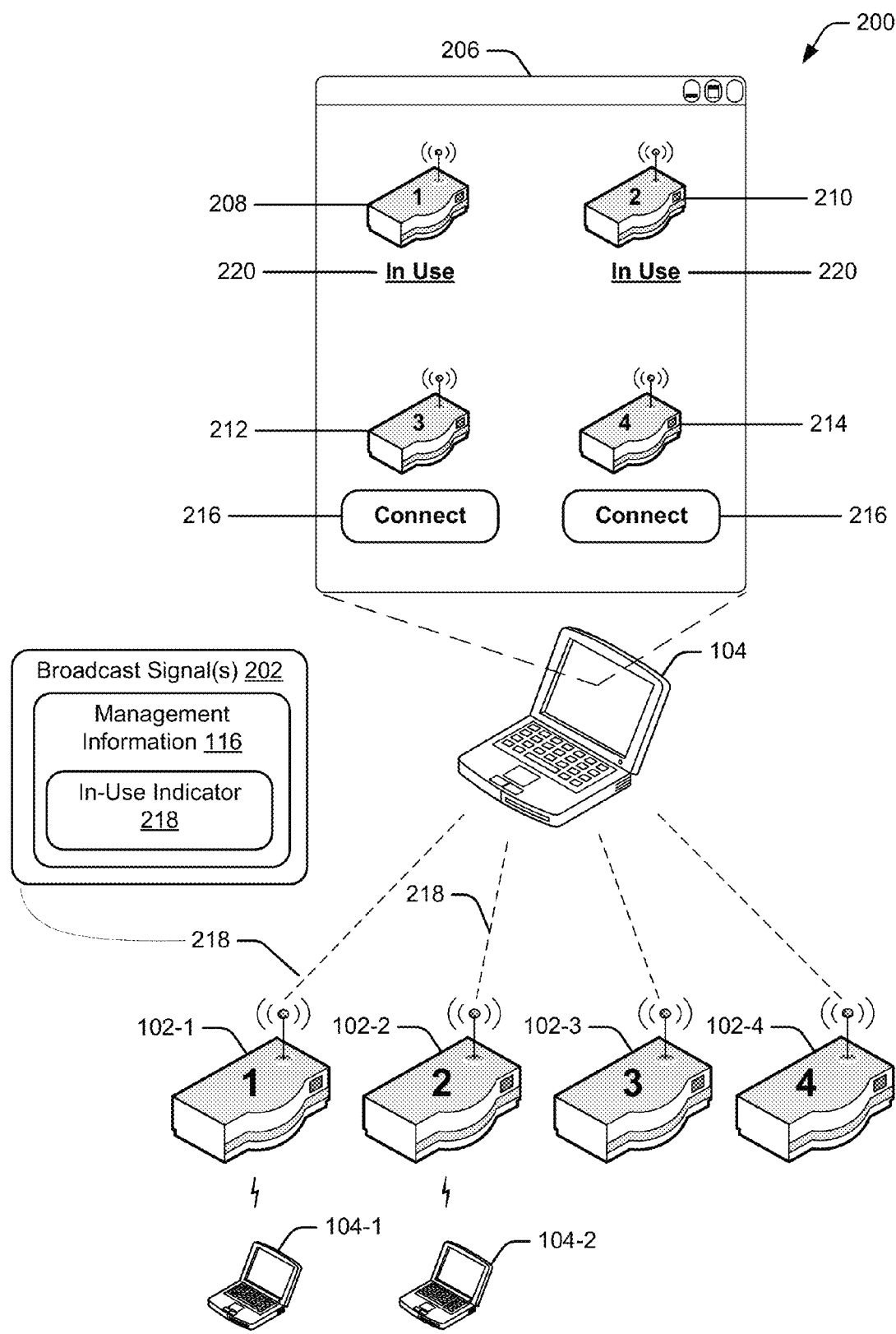
FIG. 2b illustrates an example of a wireless dock providing an in-use indicator with management information

Consider, for example, FIG. 2b which illustrates an example 200 of a wireless dock providing an in-use indicator with management information. In FIG. 2b, first wireless dock 102-1, second wireless dock 102-2, third wireless dock 102-3, and fourth wireless dock 102-4 are deployed in close proximity to each other, as described above with regards to FIG. 2a. When multiple wireless docks 102 are deployed in close proximity to each other, a user may walk up to a shared office workspace that provides several identical wireless docks, grouped closely together. In this case, it may be difficult for the user to determine which wireless dock is currently being used.

In FIG. 2b, for example, wireless docks 102-1 and 102-2 are being used by mobile devices 104-1 and 104-2, respectively. However, because wireless docks 102-1, 102-2, 102-3, and 102-4 are grouped closely together, the user may be unable to determine which wireless docks are currently being used by other mobile devices.

To prevent mobile devices from connecting to wireless dock 102 when the wireless dock is currently being used, wireless dock 102 provides an in-use indicator 218 with management information 116. In FIG. 2b, for example, wireless docks 102-1 and 102-2 provide an in-use indicator 218 with management information 116, which is communicated with broadcast signals 202.

When mobile device 104 moves into close proximity of wireless docks 102-1, 102-2, 102-3, and 102-4, wireless radio system 122 scans for and detects wireless docks 102-1, 102-2, 102-3, and 102-4. For example, wireless radio system 122 detects broadcast signals 202 transmitted by wireless transmitter 112 from each wireless dock 102. In this example, connection manager 124 detects in-use indicator 218 in broadcast signals 202 of wireless docks 102-1 and 102-2, which prevents connection manager 124 from connecting to either of these wireless docks.

In one or more implementations, detection of the in-use indicator causes connection manager 124 to automatically connect to a wireless dock that is not being used. In FIG. 2b, for example, connection manager 124 could automatically connect to wireless docks 102-3 or 102-4 because neither of these wireless docks are being used by other mobile devices.

In some cases, management information 116 may include both do-not-automatically-connect indicator 204 and in-use indicator 218. In this case, connection manager 124 enables a user of the mobile device to manually select one of the wireless docks that is not currently being used. For example, connection manager 124 may enable the user to select one of wireless docks 102-3 or 102-4 by causing display of a connection user interface 206 on a display of mobile device 104. Connection user interface 206 enables selection of one of the detected wireless docks 102 which is not currently being used. In this example, connection user interface 206 includes wireless dock identifiers 208, 210, 212, and 214, which correspond to detected wireless docks 102-1, 102-2, 102-3, and 102-4, respectively.

Unlike FIG. 2a, however, in this example connection manager 124 includes an in-use notification 220, proximate the indicator of each wireless dock that is currently being used, in connection user interface 206. The in-use notification provides a notification to the user that the wireless dock is not available because it is being used by a different mobile device. In this example, connection manager 124 provides in-use notification 220 by displaying the words "in use" proximate wireless dock identifiers 208 and 210. In addition, connection manager 124 has removed connection controls 216 that are associated with wireless dock identifiers 208 and 210. It is to be noted, of course, that connection manager 124 may provide any type of in-use notification, such as by graying out wireless dock indicators, providing an "X" or slash over wireless dock indicators, indicating that the wireless dock is busy, and so forth. Further, in some cases, indicators of wireless docks which are being used may not even be displayed in connection user interface 206.

Internet-Available Indicator

Generally speaking wireless docks offer connectivity to peripherals devices, but may not typically offer connectivity to the Internet. However, in some cases a wireless dock may offer a connection to the Internet. Knowing this information in advance of connecting enables mobile device 104 to display this information to the user or allow connection manager 124 to select a wireless dock that offers Internet access over those that do not. Thus, in one or more implementations management information 116 provided by wireless dock 102 includes an Internet-available indicator which enables connection manager 124 to determine wireless docks that are configured with Internet connectivity.

Figure 2C:
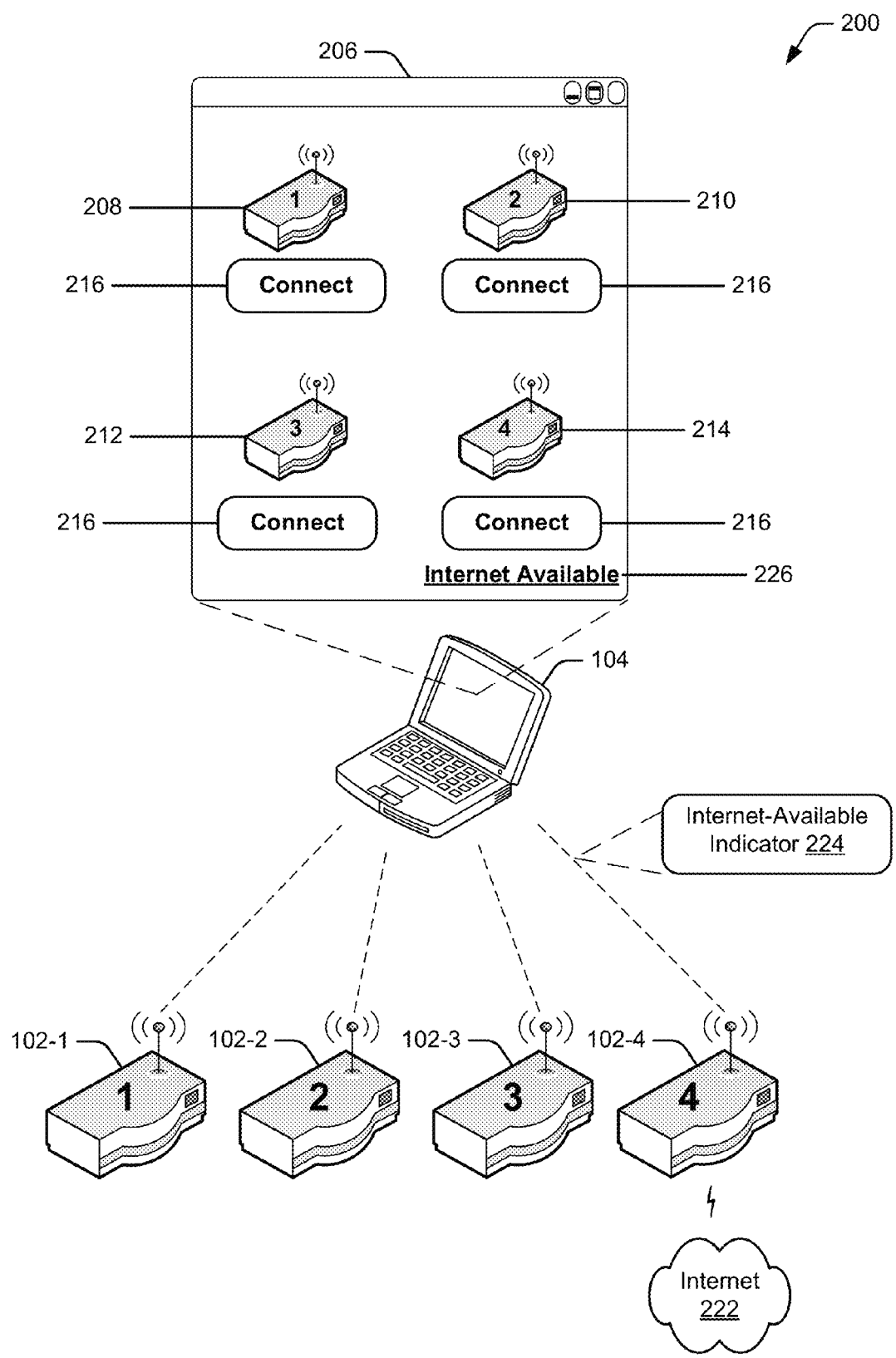
FIG. 2c illustrates an example of a wireless dock providing an Internet-available indicator with management information.

Consider, for example, FIG. 2c which illustrates an example 200 of a wireless dock providing an Internet-available indicator with management information. In FIG. 2c, first wireless dock 102-1, second wireless dock 102-2, third wireless dock 102-3, and fourth wireless dock 102-4 are deployed in close proximity to each other, as described above with regards to FIGS. 2a and 2b.

In this example, however, wireless dock 102-4 includes an Internet connection 222. Mobile devices 104 that are wirelessly connected to wireless dock 102-4 may utilize Internet connection 222 to access the Internet.

In order to inform mobile devices that an Internet connection is available, wireless dock 102 can be configured to provide an Internet-available indicator 224 with management information 116. In FIG. 2c, for example, wireless docks 102-4 provides an Internet-available indicator 224 with management information 116, which is communicated with broadcast signals 202.

When mobile device 104 moves into close proximity to wireless docks 102-1, 102-2, 102-3, and 102-4, wireless radio system 122 scans for and detects wireless docks 102-1, 102-2, 102-3, and 102-4. For example, wireless radio system 122 detects broadcast signals 202 transmitted by wireless transmitter 112 from each wireless dock 102. In this example, connection manager detects Internet-available indicator 224 in broadcast signals 202 of wireless dock 102-4. In one or more implementations, the Internet-available indicator may cause connection manager 124 to automatically connect to wireless dock 102-4 to utilize Internet connection 222.

Alternately, management information 116 may include both do-not-automatically-connect indicator 204 and Internet-available indicator 224. In this case, connection manager 124 enables a user of the mobile device to manually select one of the detected wireless docks, but presents the user with an Internet-available notification for the wireless docks with Internet connectivity. For example, to enable the manual selection of one of wireless docks 102-1, 102-2, 102-3, or 102-4, connection manager 124 causes display of a connection user interface 206 on a display of mobile device 104. Connection user interface 206 enables selection of one of the detected wireless docks 102. In this example, connection user interface 206 includes wireless dock identifiers 208, 210, 212, and 214, which correspond to detected wireless docks 102-1, 102-2, 102-3, and 102-4, respectively.

Unlike FIGS. 2a and 2b, however, in this example connection manager 124 includes an Internet-available notification 226 proximate the wireless dock indicator of each wireless dock that includes an Internet connection. The Internet available notification provides a notification to the user that the wireless dock includes an Internet connection. In this example, connection manager 124 provides Internet-available notification 226, which includes the words "Internet available", proximate wireless dock identifier 214 to notify the user that wireless dock 102-4 has an Internet connection. It is to be noted, of course, that connection manager 124 may provide any type of Internet-available notification 226, such as by providing an icon, coloring, or shading that indicates a wireless dock includes an Internet connection. Thus, the Internet-available indicator enables the user to select a wireless dock 102 that includes an Internet connection, over wireless docks that do not include an Internet connection.

Group Identifier

When a group of wireless docks are deployed in a shared office workspace they may each provide identical hardware capabilities, such as the same display type, the same number of displays, the same mouse, the same keyboard, and so on. In this Enterprise setting, the Enterprise may want to share these wireless dock work stations to enable employees to drop in at any time of the day to use any available workstation. Thus, the workstations become transient locations for employees in that an employee may be connected to one wireless dock one day and a different wireless dock the next day. Further, each of these wireless docks may be shared by multiple employees at different times throughout the day.

Thus, in one or more implementations, wireless dock 102 may provide a group identifier, with management information 116, that is associated with a number of individual wireless docks. The group identifier causes connection manager 124, and respective OS components, to treat all wireless docks with the same group identifier similarly.

Figure 2D:
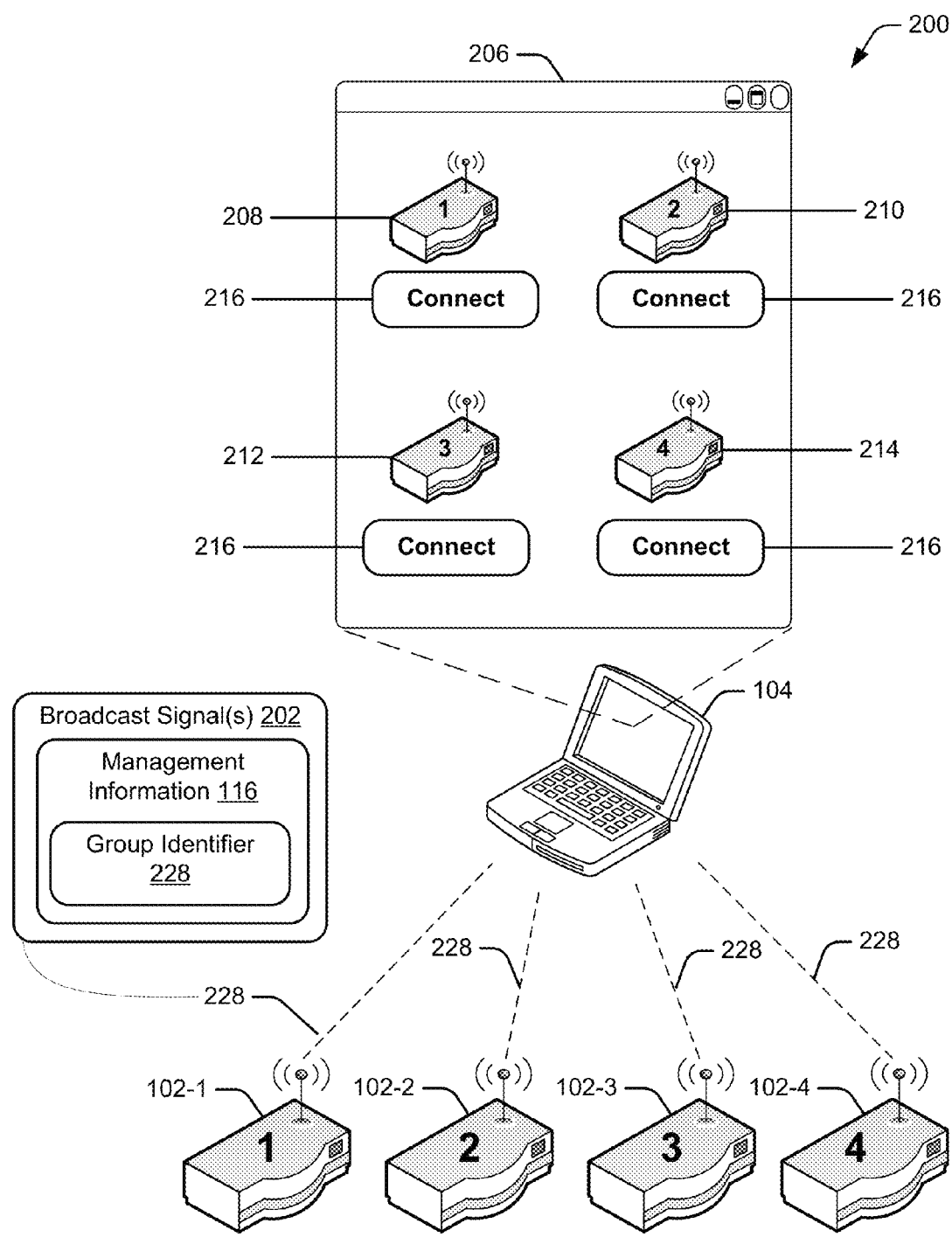
FIG. 2d illustrates an example of a wireless dock providing a group identifier with management information

Consider, for example, FIG. 2d which illustrates an example 200 of a wireless dock providing a group identifier with management information. In FIG. 2d, first wireless dock 102-1, second wireless dock 102-2, third wireless dock 102-3, and fourth wireless dock 102-4 are deployed in close proximity to each other, as described above with regards to FIGS. 2a, 2b, and 2c. When a group of wireless docks are deployed in a shared office workspace they may all provide identical hardware capabilities, such as the same display type, the same number of displays, the same keyboard, the same mouse, and so on. In FIG. 2d, for example, wireless docks 102-1, 102-2, 102-3, and 102-4 may be deployed in an Enterprise setting, and thus may be configured with similar hardware capabilities.

To provide mobile devices with a consistent wireless docking experience when connecting to different wireless docks in a group, each wireless dock 102, in a group of wireless docks, can be configured to provide a group identifier 228 with management information 116. In FIG. 2d, for example, wireless docks 102-1, 102-2, 102-3, and 102-4 each provide the same group-identifier 228 with management information 116, which is communicated with broadcast signals 202.

When mobile device 104 moves into close proximity of wireless docks 102-1, 102-2, 102-3, and 102-4, wireless radio system 122 scans for and detects wireless docks 102-1, 102-2, 102-3, and 102-4. For example, wireless radio system 122 detects broadcast signals 202 transmitted by wireless transmitter 112 from each wireless dock 102. In this example, connection manager 124 detects the same group identifier 228 in broadcast signals 202 of each wireless dock 102-1, 102-2, 102-3, and 102-4. Detection of group identifier 228 causes connection manager 124 to provide a consistent wireless docking experience for mobile device 104 whether mobile device 104 is connected to wireless dock 102-1, 102-2, 102-3, or 102-4.

As described herein, connection manager 124 may provide a consistent wireless docking experience in a variety of different ways. For example, connection manager 124 can arrange icons or windows on the user's home screen in a manner that is consistent across wireless docks. As another example, connection manager 124 can load hardware drivers (e.g., for keyboard 106-2) just once when mobile device 104 connects to one of wireless docks 104 for the first time. Thus, any settings or configurations applied to a wireless connection with a wireless dock, can be tracked and applied by connection manager 124, and the respective OS components, each time that mobile device 104 connects to a wireless dock in the group.

In one or more implementations, connection manager 124 causes display of connection user interface 206 on a display of mobile device 104. As illustrated in FIGS. 2a, 2b, and 2c, connection user interface 206 enables the user to manually connect to one of the detected wireless docks 102. In this example, connection user interface 206 includes wireless dock identifiers 208, 210, 212, and 214, which correspond to detected wireless docks 102-1, 102-2, 102-3, and 102-4, respectively. As each of these wireless docks are in the same group, the user will receive a consistent wireless docking experience by connecting to any one of wireless docks 102-1, 102-2, 102-3, or 102-4.

Generally, do-not-automatically-connect indicator 204, in-use indicator 218, and Internet-available indicator 224 may be provided in a broadcast signal 202 that is detectable by wireless radio system 122 during the "scanning" or "discovery" phases of establishing a wireless connection 114 with wireless dock 102. However, group identifier 228 may be provided by wireless dock 102 during the scanning and discovery phase, or after the scanning and discovery phase but before the end of establishing the wireless connection 114 with wireless dock 102.

Example Methods

The methods described herein are shown as sets of blocks that specify operations performed but are not necessarily limited to the order or combinations shown for performing the operations by the respective blocks. In portions of the following discussion reference may be made to environment 100 of FIG. 1 and examples 200 of FIGS. 2a, 2b, 2c, and 2d, reference to which is made for example only. The techniques are not limited to performance by one entity or multiple entities operating on one device.

Figure 3:
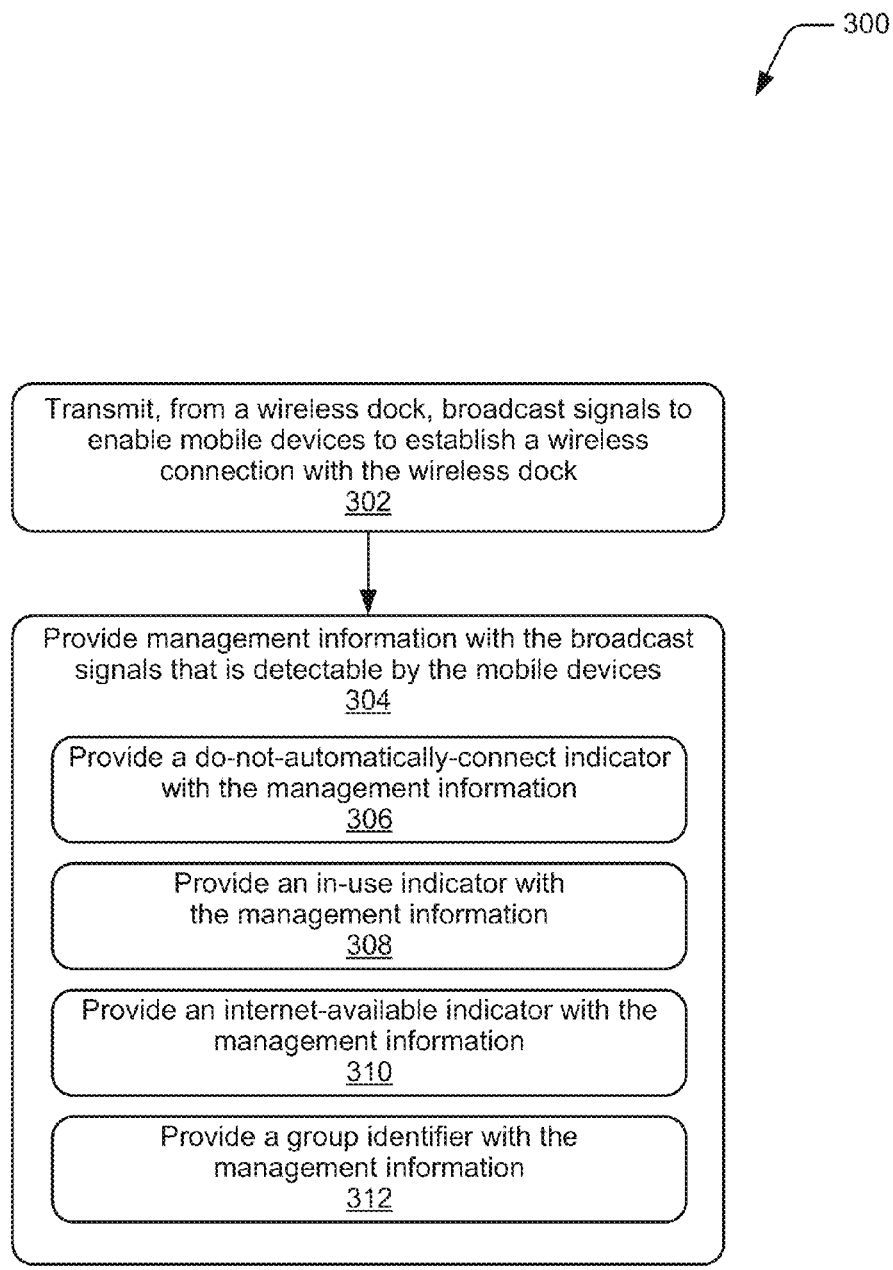
FIG. 3 illustrates an example method of providing management information with broadcast signals that are detectable by mobile devices.

FIG. 3 illustrates an example method 300 of providing management information with broadcast signals that is detectable by mobile devices. At 302, broadcast signals are transmitted from a wireless dock to enable mobile devices to establish a wireless connection with the wireless dock. For example, wireless transmitter 112 at wireless dock 102 transmits broadcast signals 202 to enable mobile devices 104 to establish a wireless connection 114 with wireless dock 102.

At 304, management information is provided with the broadcast signals by the wireless dock. For example, wireless dock 102 provides management information 116 with broadcast signals 202. Wireless dock 102 can provide a variety of different indicators with management information 116.

At 306, the wireless dock provides a do-not-automatically-connect indicator with the management information, which informs each mobile device that the mobile device should not automatically connect to the wireless dock.

Alternately or additionally, at 308, the wireless dock provides an in-use indicator when a different mobile device is already connected to the wireless dock. The in-use indicator informs each mobile device that the mobile device should not connect to the wireless dock that is in use.

Alternately or additionally, at 310, the wireless dock provides an Internet-available indicator with the management information if the wireless dock is connected to the Internet. The Internet-available indicator notifies the mobile devices that the wireless dock is connected to the Internet.

Alternately or additionally, at 312, the wireless dock provides a group identifier with the management information. The group identifier associates the wireless dock with the one or more other wireless docks in a group of wireless docks, and causes the mobile device to provide a consistent wireless docking experience for each wireless dock in the group.

Figure 4:
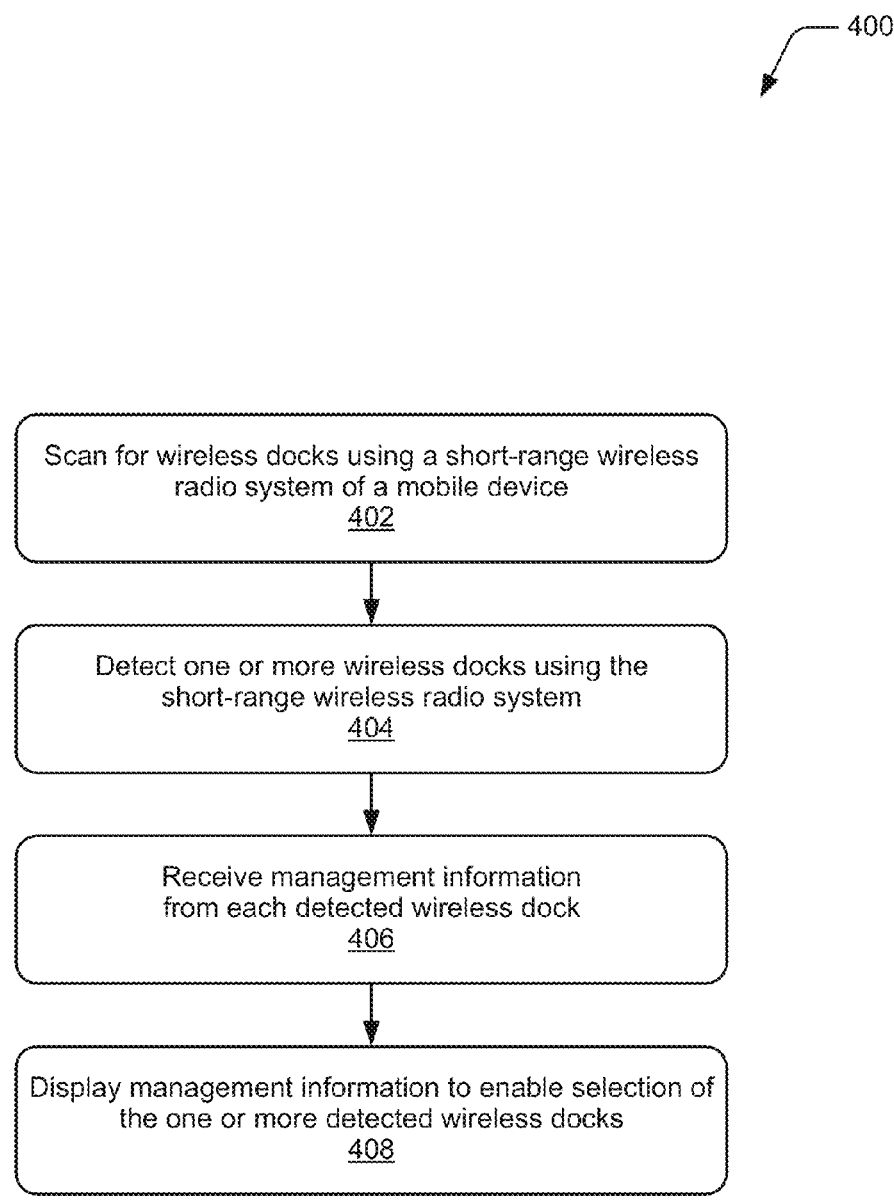
FIG. 4 illustrates an example method of displaying management information to enable selection of detected wireless docks.

FIG. 4 illustrates an example method 400 of displaying management information to enable selection of detected wireless docks.

At 402, wireless docks are scanned for using a short-range wireless radio system of a mobile device. For example, wireless radio system 122 of mobile device 104 scans for wireless docks 102.

At 404, one or more wireless docks are detected using the short-range wireless radio system. For example, wireless radio system 122 of mobile device 104 detects one or more wireless docks 102.

At 406, management information is received from each detected wireless dock. For example, wireless radio system 122 of mobile device 104 receives management information 116 from each detected wireless dock 102. As discussed throughout, the management information can include various notifications, such as a do-not-automatically-connect indicator, an in-use indicator, an Internet-available indicator, or a group identifier.

At 408, the management information is displayed to enable selection of the one or more detected wireless docks. For example, connection manager 124 causes display of connection user interface 206 to enable selection of detected wireless docks 102-1, 102-2, 102-3, or 102-4.

Figure 5:
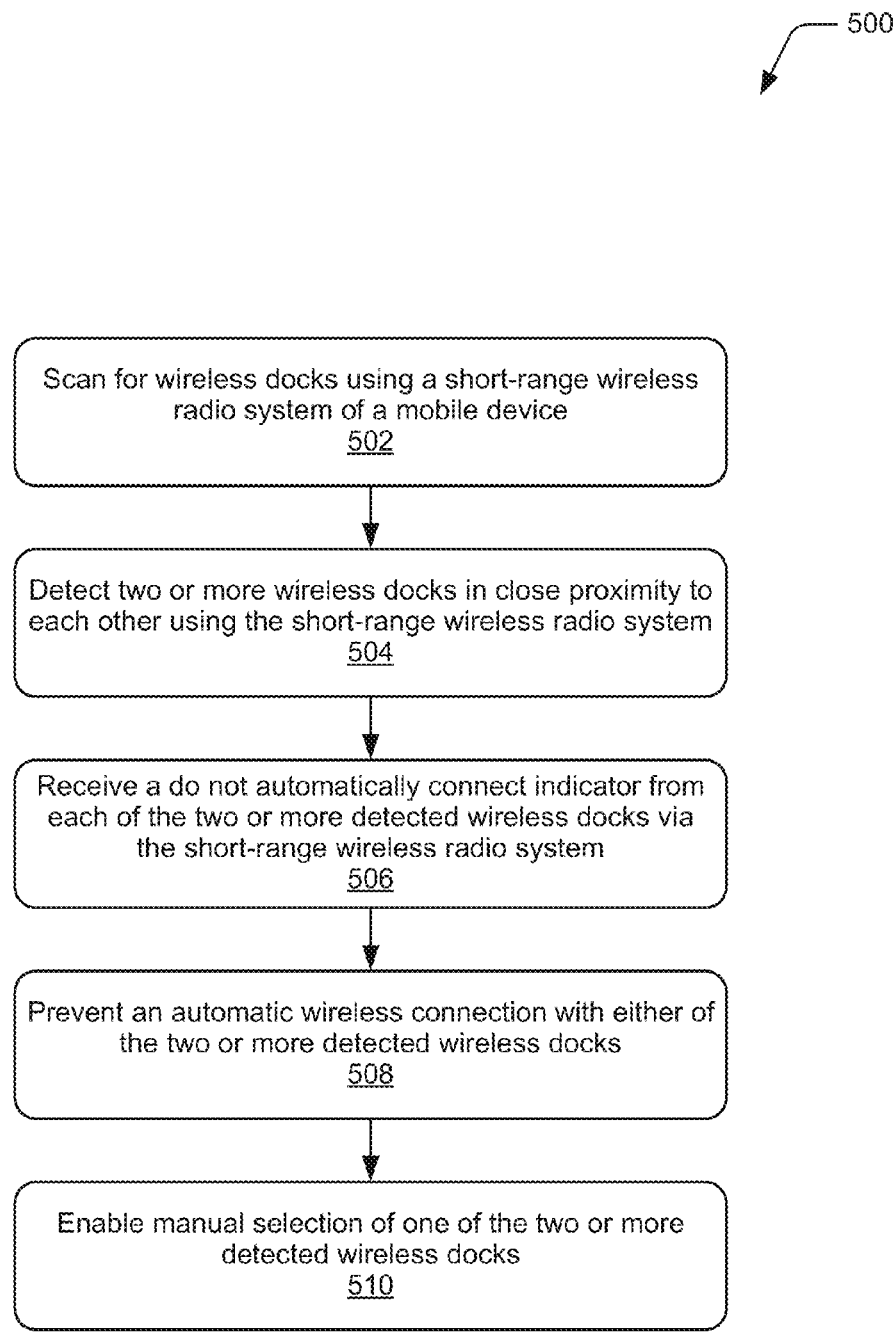
FIG. 5 illustrates an example method of preventing an automatic connection to detected wireless docks.

FIG. 5 illustrates an example method 500 of preventing an automatic connection to detected wireless docks. At 502, wireless docks are scanned for using a short-range wireless radio system of a mobile device, and at 504, two or more wireless docks in close proximity to each other are detected using the short-range wireless radio system. For example, wireless radio system 122 of mobile device 104 detects two or more wireless docks 102.

At 506, a do-not-automatically-connect indicator is received each of the two or more detected wireless docks via the short-range wireless radio. For example, wireless radio system 122 of mobile device 104 receives do-not-automatically-connect indicator 204 from each of the two or more detected wireless docks 102.

At 508, an automatic wireless connection with either of the two or more detected wireless docks is prevented. For example, connection manager 124 prevents mobile device 104 from automatically establishing a wireless connection with either of the two or more detected wireless docks.

At 510, manual selection of one of the two or more detected wireless docks is enabled. For example, connection manager 124 causes display of a connection user interface 206 to enable manual selection of one of the two or more detected wireless docks.

Figure 6:
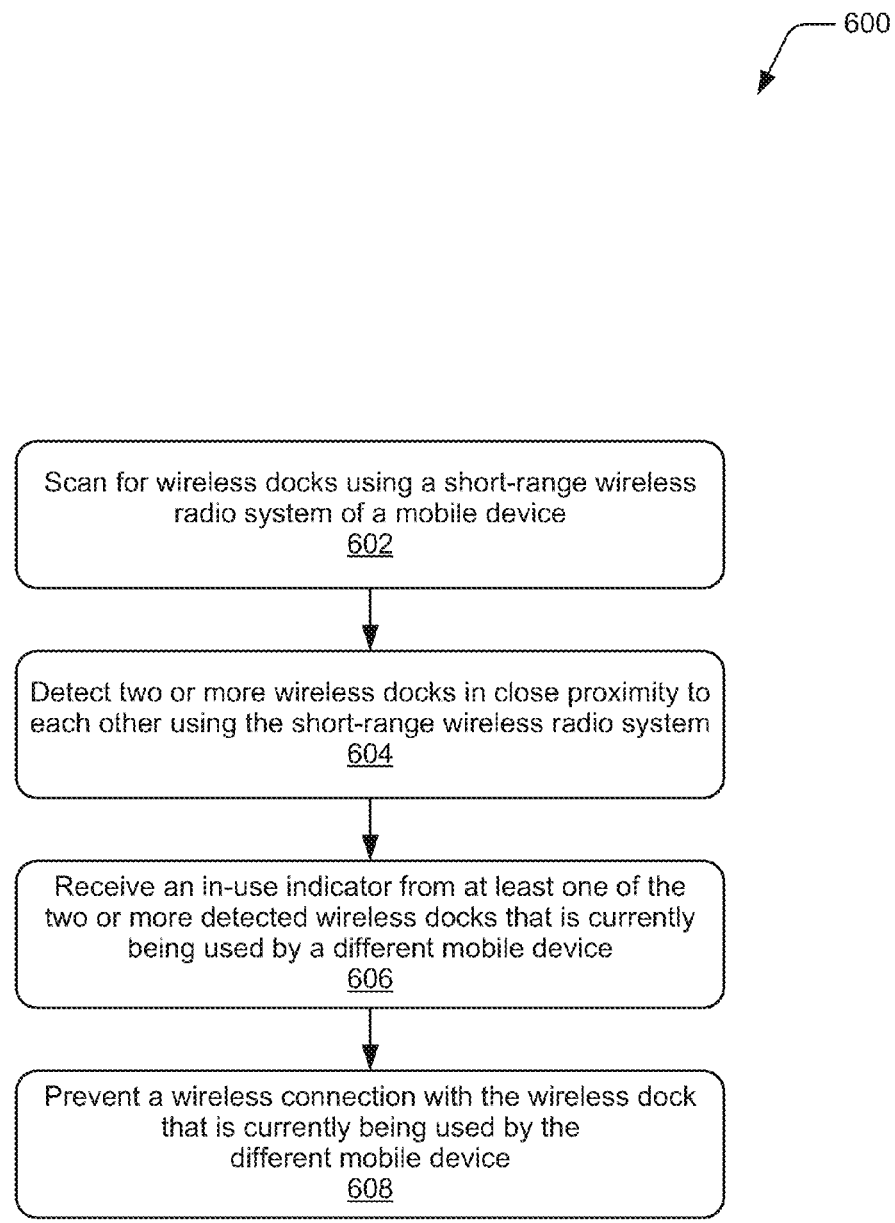
FIG. 6 illustrates an example method of preventing a wireless connection to a wireless dock that is currently being used.

FIG. 6 illustrates an example method 600 of preventing a wireless connection to a wireless dock that is currently being used. At 602, wireless docks are scanned for using a short-range wireless radio system of a mobile device, and at 604 two or more wireless docks in close proximity to each other are detected using the short-range wireless radio system. For example, wireless radio system 122 of mobile device 104 detects two or more wireless docks 102.

At 606, an in-use indicator is received from at least one of the two or more detected wireless docks that is currently being used by a different mobile device via the short-range wireless radio. For example, wireless radio system 122 of mobile device 104 receives in-use indicator 218 from at least one wireless dock 102. The in-use indicator notifies mobile device 104 that the wireless dock is currently being used by a different mobile device.

At 608, a wireless connection with the wireless dock currently being used by a different mobile device is prevented. For example, connection manager 124 prevents mobile device 104 from establishing a wireless connection with the wireless dock 102 that is currently being used by a different mobile device.

Figure 7:
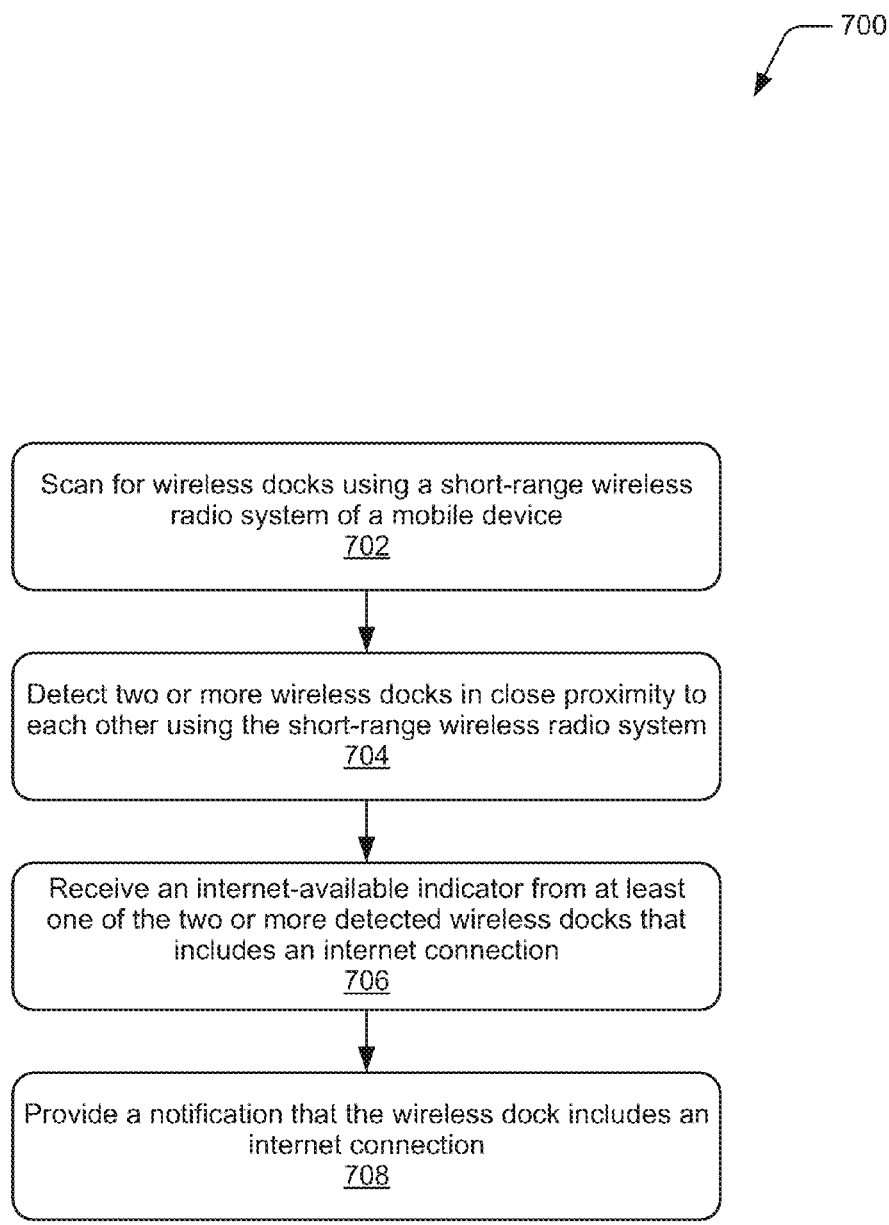
FIG. 7 illustrates an example method of providing a notification that a wireless dock includes an Internet connection.

FIG. 7 illustrates an example method 700 of providing a notification that a wireless dock includes an Internet connection. At 702, wireless docks are scanned for using a short-range wireless radio system of a mobile device, and at 704, two or more wireless docks in close proximity to each other are detected using the short-range wireless radio system. For example, wireless radio system 122 of mobile device 104 detects two or more wireless docks 102.

At 706, an Internet-available indicator is received from at least one of the two or more detected wireless docks that includes an Internet connection. For example, wireless radio system 122 of mobile device 104 receives Internet-available indicator 224 from at least one wireless dock 102.

At 708, a notification that the wireless dock includes an Internet connection is provided. For example, connection manager 124 provides a notification in connection user interface 206 that wireless dock 102-4 includes an Internet connection.

Figure 8:
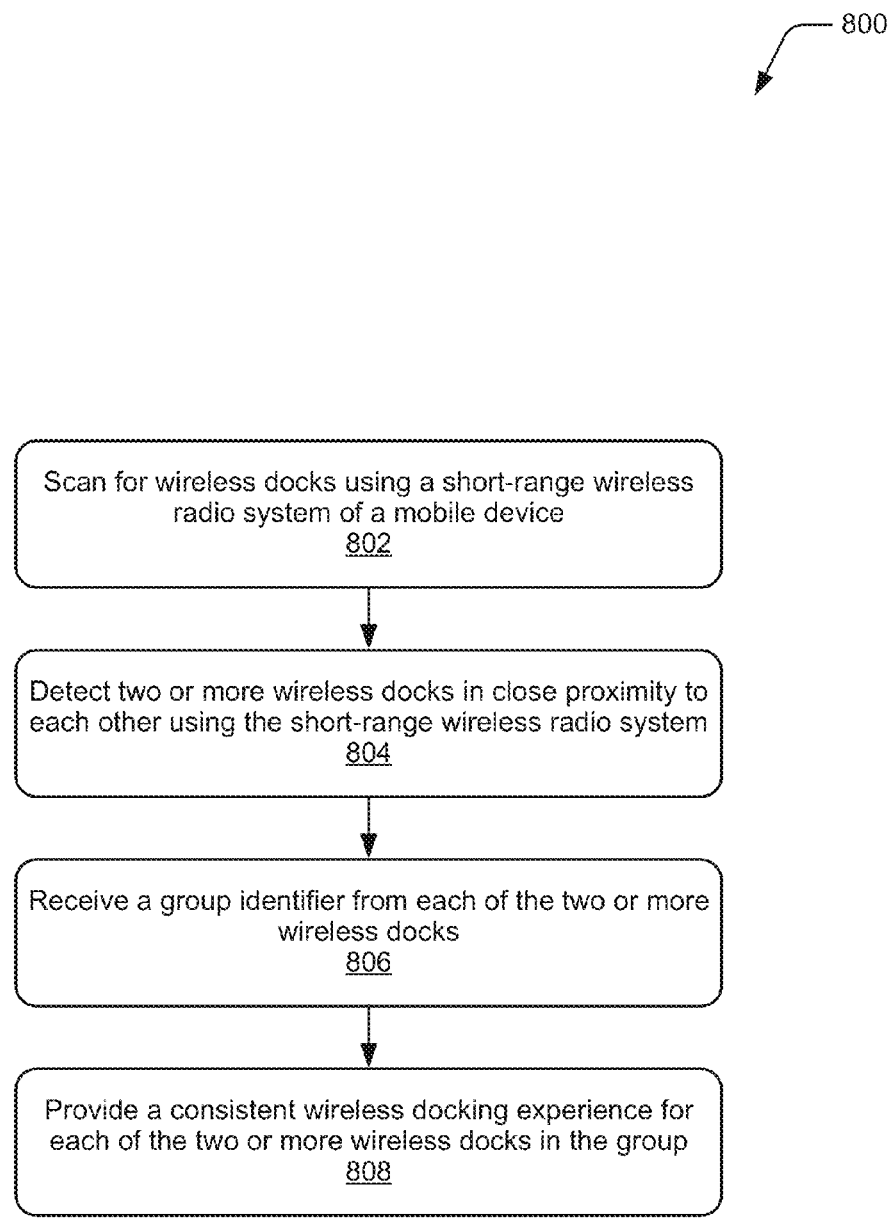
FIG. 8 illustrates an example method of providing a consistent wireless docking experience for two or more wireless docks in a group.

FIG. 8 illustrates an example method 800 of providing a consistent wireless docking experience for two or more wireless docks in a group. At 802, wireless docks are scanned for using a short-range wireless radio system of a mobile device, and at 804, two or more wireless docks in close proximity to each other are detected using the short-range wireless radio system. For example, wireless radio system 122 of mobile device 104 detects two or more wireless docks 102.

At 806, a group identifier is received from each of the two or more detected wireless docks via the short-range wireless radio. For example, wireless radio system 122 of mobile device 104 receives the same group identifier 228 from wireless docks 102-1, 102-2, 102-3, and 102-4.

At 808, a consistent wireless docking experience is provided for each of the two or more detected wireless docks in the group. For example, connection manager 124 provides a consistent wireless docking experience for mobile device 104 whether mobile device 104 is connected to wireless dock 102-1, 102-2, 102-3, or 102-4.

Example Device

Figure 9:
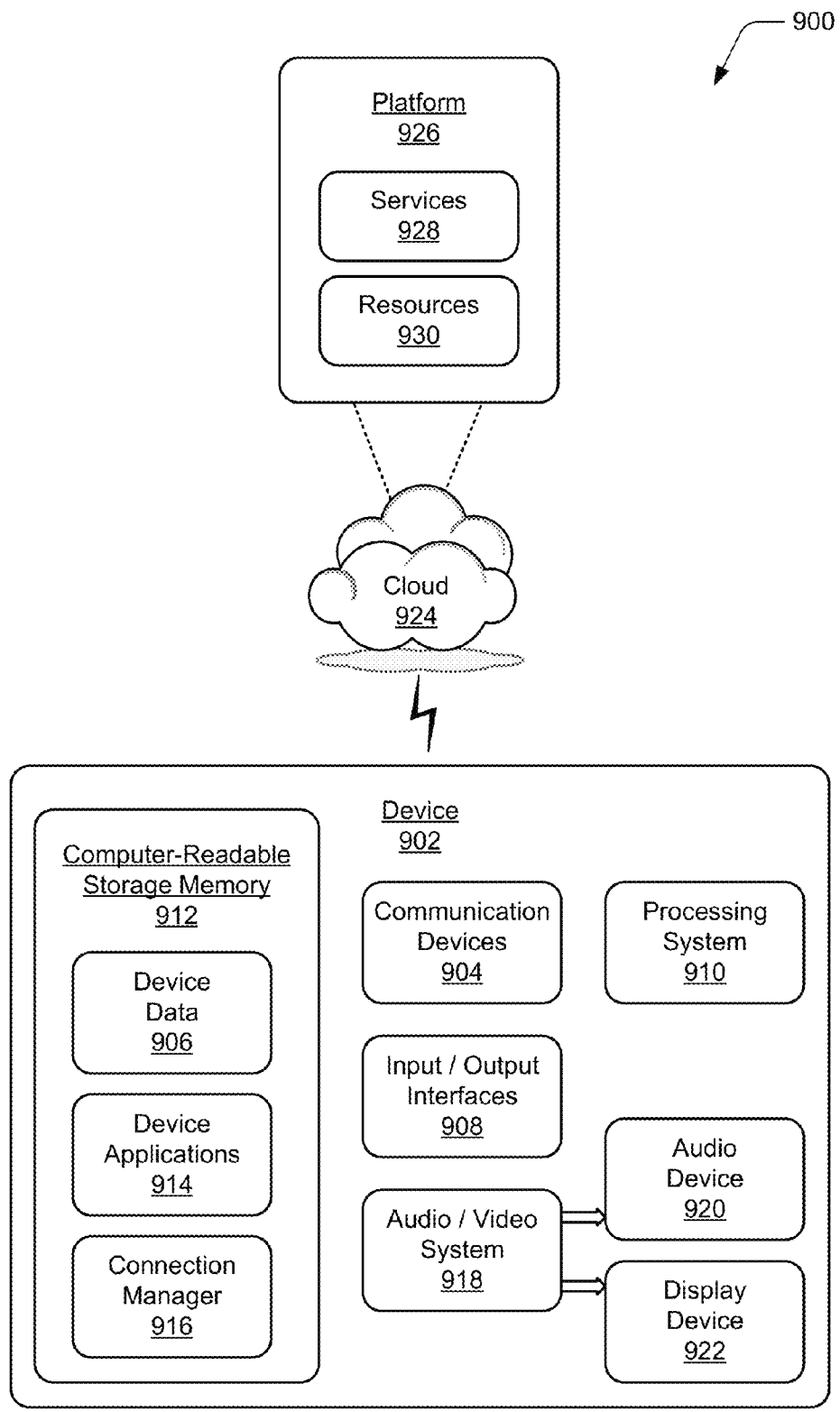
FIG. 9 illustrates an example system that includes an example device, which can implement embodiments of management capabilities for a wireless docking experience.

FIG. 9 illustrates an example system 900 that includes an example device 902, which can implement embodiments of management capabilities for a wireless docking experience. The example device 902 can be implemented as any of the computing devices described with reference to the previous FIGS. 1-8, such as any type of client device, mobile phone, tablet, computing, communication, entertainment, gaming, media playback, and/or other type of device. For example, mobile device 104 shown in FIG. 1 may be implemented as the example device 902.

The device 902 includes communication devices 904 that enable wired and/or wireless communication of device data 906, such as location signature data, positioning system data, and/or wireless radio systems data. Additionally, the device data can include any type of audio, video, and/or image data. The communication devices 904 can also include transceivers for cellular phone communication and for network data communication.

The device 902 also includes input/output (I/O) interfaces 908, such as data network interfaces that provide connection and/or communication links between the device, data networks, and other devices. The I/O interfaces can be used to couple the device to any type of components, peripherals, and/or accessory devices. The I/O interfaces also include data input ports via which any type of data, media content, and/or inputs can be received, such as user inputs to the device, as well as any type of audio, video, and/or image data received from any content and/or data source.

The device 902 includes a processing system 910 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 902 may further include any type of a system bus or other data and command transfer system that couples the various components within the device. A system bus can include any one or combination of different bus structures and architectures, as well as control and data lines.

The device 902 also includes a computer-readable storage memory 912, such as data storage devices that can be accessed by a computing device, and that provide persistent storage of data and executable instructions (e.g., software applications, programs, functions, and the like). Examples of the computer-readable storage memory 912 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations.

The computer-readable storage memory 912 provides storage of the device data 906 and various device applications 914, such as an operating system that is maintained as a software application with the computer-readable storage memory and executed by the processing system 910. In this example, the device applications include a connection manager 916 that implements embodiments of management capabilities for a wireless docking experience, such as when the example device 902 is implemented as mobile device 104 shown in FIG. 1. An example of the connection manager 916 is the connection manager 124 that is implemented by mobile device 104, as described with reference to FIGS. 1-8.

The device 902 also includes an audio and/or video system 918 that generates audio data for an audio device 920 and/or generates display data for a display device 922. The audio device and/or the display device include any devices that process, display, and/or otherwise render audio, video, display, and/or image data. In implementations, the audio device and/or the display device are integrated components of the example device 902. Alternatively, the audio device and/or the display device are external, peripheral components to the example device.

In embodiments, at least part of the techniques described for management capabilities for a wireless docking experience may be implemented in a distributed system, such as over a "cloud" 924 in a platform 926. The cloud 924 includes and/or is representative of the platform 926 for services 928 and/or resources 930. For example, the services 928 and/or the resources 930 may include the connection manager.

The platform 926 abstracts underlying functionality of hardware, such as server devices (e.g., included in the services 928) and/or software resources (e.g., included as the resources 930), and connects the example device 902 with other devices, servers, etc. The resources 930 may also include applications and/or data that can be utilized while computer processing is executed on servers that are remote from the example device 902. Additionally, the services 928 and/or the resources 930 may facilitate subscriber network services, such as over the Internet, a cellular network, or Wi-Fi network. The platform 926 may also serve to abstract and scale resources to service a demand for the resources 930 that are implemented via the platform, such as in an interconnected device embodiment with functionality distributed throughout the system 900. For example, the functionality may be implemented in part at the example device 902 as well as via the platform 926 that abstracts the functionality of the cloud 924.

CONCLUSION

Although embodiments of management capabilities for a wireless docking experience have been described in language specific to features and/or methods, the appended claims are not necessarily limited to the specific features or methods described. Rather, the specific features and methods are disclosed as example implementations of management capabilities for a wireless docking experience, and other equivalent features and methods are intended to be within the scope of the appended claims. Further, various different embodiments are described and it is to be appreciated that each described embodiment can be implemented independently or in connection with one or more other described embodiments.

What is claimed is:

1. A wireless dock, the wireless dock comprising:
   peripheral ports to enable peripheral devices to connect to the wireless dock; and
   a wireless transmitter configured to transmit broadcast signals to enable mobile devices to detect the wireless dock and establish a wireless connection with the wireless dock to use the connected peripheral devices, the wireless dock configured to provide management information with the broadcast signals that is detectable by the mobile devices during a scanning or discovery phase and is usable by the mobile devices to manage the wireless connection to, and experience with, the wireless dock, the management information provided with the broadcast signals transmitted by the wireless transmitter including a do-not-automatically-connect indicator which prevents mobile devices from automatically connecting to the wireless dock, an Internet-available indicator that indicates whether the wireless dock is connected to the internet, an in-use indicator if the wireless dock is currently being utilized by another mobile device, and a group identifier that associates the wireless dock with one or more other wireless docks that are configured with similar hardware capabilities.

2. The wireless dock as recited in claim 1, wherein the in-use indicator prevents other mobile devices from connecting to the wireless dock.

3. The wireless dock as recited in claim 1, wherein the wireless dock is located in close proximity to the one or more other wireless docks that are configured with similar hardware capabilities.

4. The wireless dock as recited in claim 1, wherein the wireless connection comprises a WiGig wireless connection.

5. The wireless dock as recited in claim 1, wherein the peripheral devices comprise one or more of a monitor, a keyboard, or a mouse.

6. The wireless dock as recited in claim 1, wherein the group identifier causes mobile devices to provide a consistent wireless docking experience for wireless docks with the same group identifier.

7. The wireless dock as recited in claim 6, wherein the providing the consistent wireless docking experience comprises applying the same settings and configurations when the mobile device is connected to the wireless docks with the same group identifier.

8. A method comprising:
  scanning, using a short-range wireless radio system of a mobile device, for a wireless dock during a scanning or discovery phase;
  detecting, with the short-range wireless radio system, two or more wireless docks;
  receiving management information from each detected wireless dock via the short-range wireless radio system, the management information including a group identifier that indicates that each of the two or more detected wireless docks are configured with similar hardware capabilities and a do-not-automatically-connect indicator that prevents the mobile device from automatically connecting to the two or more detected wireless docks; and
  causing display of a connection user interface to enable a manual selection of one of the two or more detected wireless docks.

9. The method as recited in claim 8, wherein the connection user interface includes a wireless dock identifier for each of the two or more detected wireless docks and a connection control, associated with each wireless dock identifier, the connection control selectable to establish a wireless connection with the associated wireless dock.

10. The method as recited in claim 8, wherein the receiving the management information further comprises receiving an in-use indictor from at least one of the two or more detected wireless docks that is currently being used by a different mobile device, and wherein the method further comprises preventing the mobile device from connecting to the wireless dock that is currently being used by the different mobile device.

11. The method as recited in claim 8, wherein the receiving the management information further comprises receiving an Internet-available indicator from at least one of the two or more detected wireless docks that includes an Internet connection, and wherein the method further comprises providing an Internet-available notification in the connection user interface that is associated with the wireless dock that includes the Internet connection.

12. The method as recited in claim 8, wherein the group-identifier causes consistent wireless docking experience to be provided for each of the two or more detected wireless docks.

13. The method as recited in claim 12, wherein the providing the consistent wireless docking experience comprises applying the same settings and configurations when the mobile device is connected to each of the detected wireless docks with the same group identifier.

14. The method as recited in claim 8, wherein the short-range wireless radio system comprises a WiGig wireless connection.

15. A mobile device, comprising:
  a short-wave wireless radio system configured to scan for and detect one or more wireless docks during a scanning or discovery phase;
  a processing system to implement a connection manager that is executable and configured to:
  receive management information from each of the detected wireless docks, the management information including at least a group identifier that associates at least one of the detected wireless docks with one or more other wireless docks that are configured with similar hardware capabilities and a do-not-automatically-connect indicator;
    prevent the mobile device from automatically connecting to the detected wireless docks based on the do-not-automatically-connect indicator; and
    cause display of a connection user interface that enables a manual selection of one of the detected wireless docks to form a wireless connection with the selected wireless dock.

16. The mobile device as recited in claim 15, wherein the short-wave wireless radio system comprises a WiGig radio system.

17. The mobile device as recited in claim 15, wherein the management information further includes an in-use indictor that is received from at least one of the detected wireless docks, and wherein the connection manager is further configured to provide a notification that the wireless dock is in use.

18. The mobile device as recited in claim 15, wherein the connection manager is further configured to provide a consistent wireless docking experience for each detected wireless device with the same group identifier.

19. The mobile device as recited in claim 18, wherein the connection manager provides a consistent wireless docking experience by applying the same settings and configurations when the mobile device is connected to each of the detected wireless docks with the same group identifier.

* * * * *